United States Patent [19]

Earing, Jr.

[11] Patent Number: 4,489,977
[45] Date of Patent: Dec. 25, 1984

[54] PICKUP TRUCK WITH INTERCHANGEABLE BED COMPONENTS

[76] Inventor: James F. Earing, Jr., 3602 NE. 115th Ave., Portland, Oreg. 97220

[21] Appl. No.: 390,265

[22] Filed: Jun. 21, 1982

[51] Int. Cl.³ .............................................. B62D 23/00
[52] U.S. Cl. ................... 296/35.3; 296/183; 414/498
[58] Field of Search .............. 296/35.3, 37.1, 203, 296/204, 183, 10; 410/67, 81; 414/498; 105/268, 261 R, 261 A; 280/800, 107, 790; 298/12-16

[56] References Cited

U.S. PATENT DOCUMENTS

| | | | |
|---|---|---|---|
| 1,293,090 | 2/1919 | Harmon . | |
| 1,293,664 | 2/1919 | Avery | 410/67 |
| 1,442,769 | 1/1923 | Jackson et al. . | |
| 1,615,532 | 1/1927 | Baxter | 296/35.3 |
| 1,712,398 | 5/1929 | Palmero | 298/12 |
| 2,057,833 | 10/1936 | Jungersen | 298/12 |
| 2,494,945 | 1/1950 | Huntington | 280/800 |
| 2,530,097 | 11/1950 | Troth | 296/183 |
| 2,820,559 | 1/1958 | Armitage | 414/498 |
| 3,119,503 | 1/1964 | Herpich et al. | 214/512 |
| 3,520,433 | 7/1970 | Blackburn | 214/512 |
| 3,817,413 | 6/1974 | Ham | 414/498 |
| 3,910,624 | 10/1975 | Becker | 410/81 |
| 3,915,476 | 10/1975 | Burkle | 280/422 |
| 4,268,083 | 5/1981 | Carpenter | 296/10 |
| 4,269,443 | 5/1981 | Farmer | 296/1 |

FOREIGN PATENT DOCUMENTS 0749707  7/1980  U.S.S.R. .............................. 414/498

*Primary Examiner*—Robert B. Reeves
*Assistant Examiner*—Dennis H. Pedder
*Attorney, Agent, or Firm*—Eugene D. Farley

[57] ABSTRACT

A pickup truck assembly is fitted with a track which allows various bed components to be easily removed or installed. The track is mounted on the frame and the bed component mounts a wheel which rides in the track to guide the bed component into place. The bed component includes means to secure it removeably to the frame and an electrical connector for ready connection of the lights.

1 Claim, 4 Drawing Figures

PICKUP TRUCK WITH INTERCHANGEABLE BED COMPONENTS

BACKGROUND OF THE INVENTION

This invention relates to pickup trucks and similar vehicles. It particularly relates to pickup trucks having readily interchangeable bed components.

In the past, pickups have generally been constructed with a permanent cargo box for a bed. At best, it was difficult to remove the cargo box, and required custom fabrication to replace it with another bed, such as a flatbed.

The prior art discloses various means for attaching and detaching bed components from the truck frame. However, these are generally designed for large trucks and require the use of jacks and ramps for making the attachment. They may be categorized as complicated devices, generally employed for securing truck bodies to otherwise permanently mounted flatbeds.

Pickup trucks, especially the smaller "import" pickups, do not have such heavy bodies. Accordingly, they are well suited for use with interchangeable beds.

It is the general object of the present invention to provide a pickup truck assembly having interchangeable bed components.

Another object is to provide interchangeable bed components of several types, e.g. cargo box, flatbed, utility box, dump box and camper.

Another object is to provide readily detachable bed components which can be easily interchanged by one person, or with minimum manpower.

A further object is to provide bed components complementing the style of the pickup cab.

Another object is to provide means for readily securing interchangeable bed components releasably to the frame.

Still another object is to provide interchangeable bed components which conform to the frame and the rear wheels, and which may be removed without interference with the wheels.

A still further object is to provide an interchangeable bed component pickup truck assembly which is easily converted from a standard or stock pickup.

These and other objects and advantages and the manner in which they are achieved will be made apparent in the following specification and claims.

SUMMARY OF THE INVENTION

The pickup truck assembly of the present invention includes a frame, a track mounted on the frame, and a bed component engaging the track and mounted for guided movement thereon. The bed component is readily moved along the track as desired for installing or detaching the bed component using a minimum amount of manpower, and releasably secured in place.

DESCRIPTION OF THE PREFERRED EMBODIMENT

Figure 1:
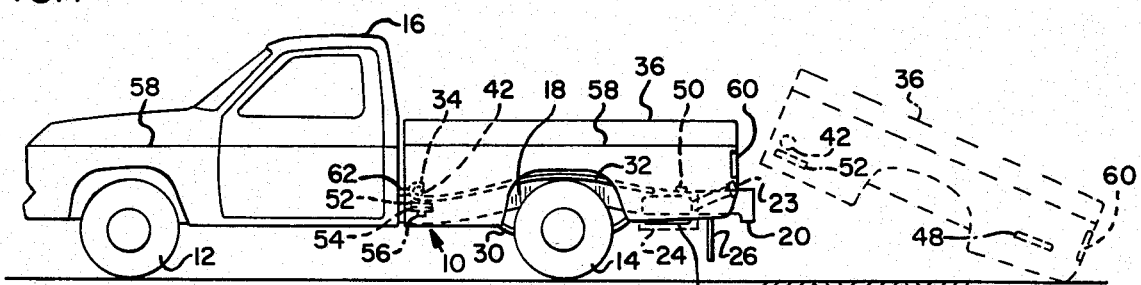
FIG. 1 is a side elevation of the pickup truck assembly of the present invention illustrating the use of a cargo box as a bed component.

As shown in FIG. 1, the pickup truck assembly of the present invention includes a frame shown generally at 10 mounted on pairs of front wheels 12 and rear wheels 14. A cab 16 is mounted on the frame.

Behind cab 16 frame 10 is open or exposed, except for the bed which is mounted thereon.

Figure 4:
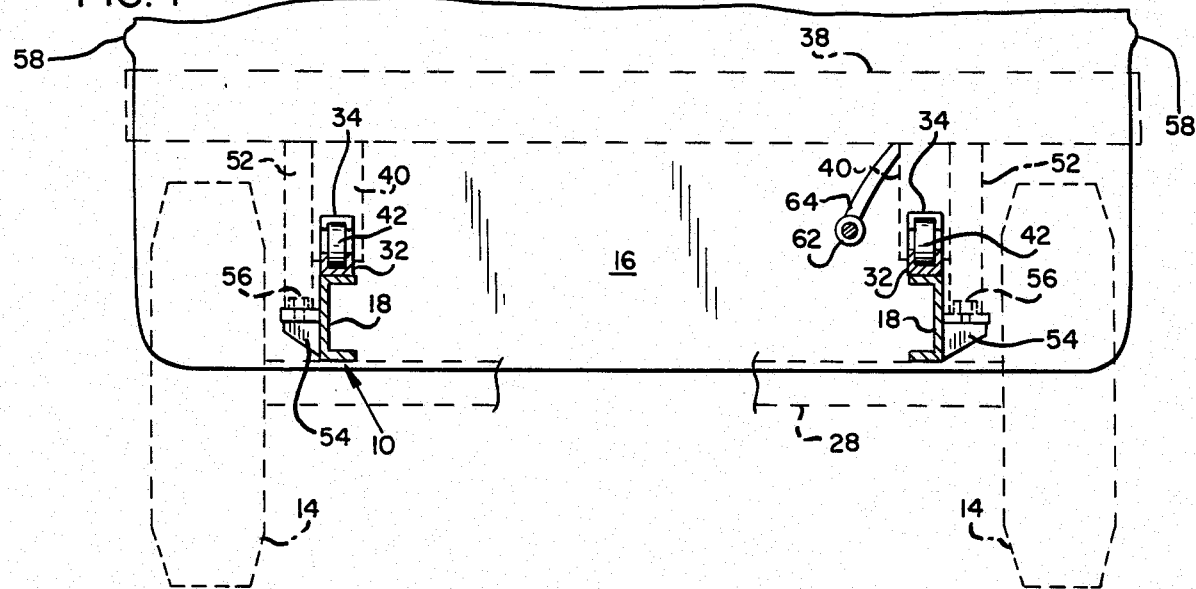
FIG. 4 is an end sectional elevation taken along the line 4—4 of FIG. 2.

As shown in FIG. 4, frame 10 includes a longitudinal beam member 18 extending along each side of the pickup behind cab 16.

Bumper 20 (FIG. 1) is attached to the longitudinal members and forms the rear end of the vehicle.

Gas tank 22 is preferably mounted in the rear of the vehicle, with its filler spout 23 adjacent the center of bumper 20. A safety plate 24 surrounds the gas tank.

Mud flaps 26 depend from longitudinal frame members 18 in back of rear wheels 14.

Figure 3:
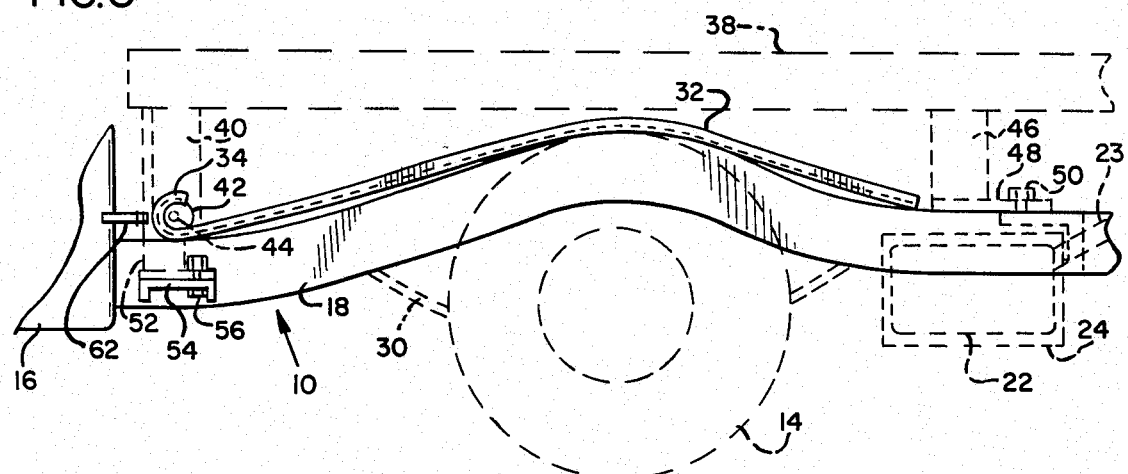
FIG. 3 is a fragmentary side elevation of the frame and track components of the pickup truck assembly of the present invention.

Rear wheels 14 are mounted on an axle 28 (FIG. 4) by springs 30 (FIG. 1). In most conventional pickups, longitudinal frame members 18 are curved, as best shown in FIG. 3, to extend over axle 28. This allows the bed of the pickup to be lower to the ground.

The assembly may include air shock absorbers (not shown) or the like to level the load at various different weights as is well understood in the art.

A track 32 is mounted on longitudinal beam members 18 of frame 10. The track extends substantially from cab 16 toward the rear end of the frame. FIG. 4 illustrates a pair of similar tracks 32, one on each longitudinal member.

The track 32 substantially conforms to the shape of longitudinal frame member 18. The central portion of the track is bowed, extending substantially as high as the tops of rear wheels 14. The ends of the track abut the frame. Thus whatever curvature is desired may be accommodated.

The track 32 may be mounted on longitudinal frame members 18 by bolting, welding or any other method as desired.

The track 32 is preferably an upwardly opening channel. A stop means is provided, at the front end of the track adjacent the cab, to stop the forward movement of the bed component. This is preferably provided by an upward and rearward curl 34 in the channel of track 32 as best illustrated in FIG. 3.

The track 32 may extend a considerable distance toward the rear of the vehicle, but need not extend completely to bumper 20, as will be discussed later.

Figure 2:
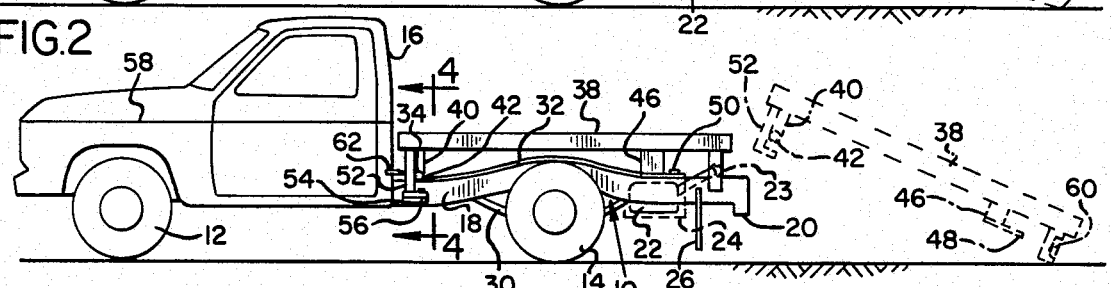
FIG. 2 is a side elevation similar to FIG. 1 illustrating the use of a flatbed as a bed component.

A bed component is provided, and this may be of several types or styles. FIG. 1 illustrates the use of a cargo box 36, as is common on most pickups, adapted for removability according to the present invention. FIG. 2 illustrates the use of a flatbed 38 according to the present invention. An example of other bed components, each of which may be used on any pickup so constructed, include a utility box, a dump bed, and a camper.

The bed component mounts behind the cab and includes a cargo-supporting surface of the various types discussed above.

Track engaging means depends from the cargo-supporting surface. Preferably such means includes a pedestal 40 of the height necessary to mount the cargo-supporting surface above track 32 at the desired height. At the end of pedestal 40 is mounted a wheel 42 on a bearing axle 44. The wheel is configured and dimensioned to roll in the track channel for guiding movement of the cargo-supporting surface along the track.

It will be noted that with cargo box 36 of FIG. 1, a long pedestal 40 is not required since the bed extends down to the track. However, with the flatbed 38 of FIGS. 2-4, a relatively longer pedestal 40 is required.

Wheel 42 and curl 34 are configured and dimensioned to fit together with substantially close tolerances. One objective of this arrangement is to provide a stop preventing the bed component from rolling too far forward and bumping cab 16. Another function is to secure the front end of the bed component against vertical displacement.

While it can be seen that a wheel provides the preferred apparatus for the track engaging means, other apparatus, such as a slide member, may be employed.

Securing means is provided for securing the cargo-supporting surface to the frame. At the rear end of the pickup pedestals 46 depend from the cargo-supporting surface and abut frame members 18. A foot 48 on the base of the pedestal is secured by a bolt 50.

Similar securing means may be used on the front corners of the bed component. As best shown in FIG. 4, pedestal 52 extends downwardly adjacent pedestal 40. It is bolted to a bracket 54 on the side of frame member 18 by a bolt 56. In this manner all four corners of the bed component may be secured to the frame, and the bed component may still be readily loosened for removal.

With reference to FIG. 1, it should be noted that cargo box 36 and cab 16 are of complementary style, and a style line is denoted at 58. According to the present invention it is possible and preferable to mount the cargo box at a height to maintain the continuity of the style lines.

Lights 60 are normally provided on the rear of the bed component of a pickup. The present invention accommodates a rapid connection for controlling the lights by the provision of a connector 62 which is integral with the wiring 64 of the bed component and cab 16.

OPERATION

The present invention makes changing bed components on pickups or similar vehicles a relatively easy and simple task.

To remove the bed component, bolts 50 and 56 are removed and light connector 62 disengaged. This releases the bed component. Wheel 42 is then free to roll along track 32. The bed is easily rolled rearwardly. It should be noted that with cargo box 36 rear wheels 14 are easily cleared since track 32 is bowed over the wheels. The rear end of the bed component may then be set on the ground and the front end lifted off the track.

To install a bed component the reverse procedure is followed. When the bed component is tilted upwardly as shown in phantom line in FIGS. 1 and 2, it can overlap the rear of the frame and wheels 42 can be set directly on the ends of track 32.

Having described my invention in its preferred embodiment, I claim:

1. A pickup truck assembly with interchangeable bed components, comprising in combination:
   (a) a pickup truck having a frame mounted on a pair of front wheels and a pair of axle-mounted rear wheels, and a cab mounted on the frame, the frame including a pair of laterally spaced, longitudinally extending beam members curved upward intermediate their ends to extend over the rear wheel axle,
   (b) an upwardly opening channel truck mounted on each beam member and extending substantially from the cab toward the rear end of the frame, the tracks conforming substantially to the curved shape of the beam members and terminating at their front ends in upwardly and rearwardly curled segments arranged to releasably capture wheels therein for securing the wheels against forward, lateral and upward displacement therefrom, and
   (c) a bed component for removable mounting behind the cab and comprising:
      (1) a cargo-supporting surface,
      (2) a pair of laterally spaced bed support wheels on the forward end of the bed arranged to movably engage the laterally spaced tracks on the truck frame beam members for movement along the latter into and out of releasable capture in said curled segments of the tracks for releasably securing the front end of the bed component to the truck frame, and
      (3) rearward bed securing means on the rearward ends of the bed component and truck frame arranged for releasable connection for securing the rearward end of the bed to the truck frame against rearward, lateral and upward displacement relative to the truck frame.

* * * * *